(12) United States Patent
Li et al.

(10) Patent No.: US 6,230,278 B1
(45) Date of Patent: *May 8, 2001

(54) MICROPROCESSOR WITH FUNCTIONAL UNITS THAT CAN BE SELECTIVELY COUPLED

(75) Inventors: Stephen (Hsiao Yi) Li, Garland; Jonathan Rowlands, Dallas; Fuk Ho Pius Ng; Maria B. H. Gill, both of Plano; Frank L. Laczko, Sr., Allen; Dong-Seok Youm; David (Shiu) W. Kam, both of Richardson, all of TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/850,872

(22) Filed: May 2, 1997

(51) Int. Cl.[7] .................................................. G06F 1/28
(52) U.S. Cl. ........................................ 713/324; 712/219
(58) Field of Search ........................... 712/216, 43, 217, 712/219, 229; 713/322, 324

(56) References Cited

U.S. PATENT DOCUMENTS

| | | | |
|---|---|---|---|
| 5,155,816 | 10/1992 | Kohn | 395/375 |
| 5,392,437 | 2/1995 | Matter et al. | 395/750 |
| 5,649,138 | * 7/1997 | Ireton | 712/217 |
| 5,721,945 | * 2/1998 | Mills et al. | 712/35 |
| 5,734,913 | * 3/1998 | Iwamura et al. | 713/322 |

OTHER PUBLICATIONS

MPEG–1, 3–11172.

MPEG–2, Information Technology—Generic Coding of Moving Pictures and Audio: Audio ISO/IEC 13818–3, 2$^{nd}$ Edition, Feb. 20, 1997 (ISO/IEC JTC1/SC29/WG11 N1519), Int'l Org. for Standardisation Coding of Moving Pictures and Audio.

Digital Audio Compression Standard (AC–3), Dec., 20, 1995, Advanced Television Systems Committee, ATSC Standard.

TI–17424A (S.N. 08/475,251), allowed, Integrated Audio Decoder System and Method of Operation.

TI–17600 (S.N. 08/054,127), allowed, System Decoder Circuit With Temporary Bit Storage and Method of Operation.

TI–24442P (S.N. 60/030,106), filed Provisionally Nov. 1, 1996. Integrated Audio/Video Decoder Circuitry.

* cited by examiner

Primary Examiner—John F. Niebling
Assistant Examiner—Stacy Whitmore
(74) Attorney, Agent, or Firm—Gerald E. Laws; W. James Brady, III; Frederick J. Telecky, Jr.

(57) ABSTRACT

A data processing device is provided which has multiprocessors that can be configured on a cycle by cycle basis as loosely coupled or tightly coupled. Bit-stream Processing Unit (BPU) 110 executes instructions from ROM 112 and accesses data from RAM 111. Similarly, Arithmetic Unit (AU) 120 executes instructions from ROM 122 and accesses data from RAM 121. Both processor operate in parallel and exchange data by accessing RAM 121. AU 120 can receive an instruction directive from BPU 110 directing it to perform a selected sequence of instructions in a loosely coupled manner. AU 120 can also receive an instruction directive from BPU 110 directing that a portion of AU 120 operationally replace a portion of BPU 110 for the duration of one instruction which allows data to be passed directly between the processors in a tightly coupled manner.

18 Claims, 8 Drawing Sheets

MICROPROCESSOR WITH FUNCTIONAL UNITS THAT CAN BE SELECTIVELY COUPLED

FIELD OF THE INVENTION

This invention relates in general to the field of electronic systems and more particularly to an improved modular audio data processing architecture and method of operation.

BACKGROUND OF THE INVENTION

Audio and video data compression for digital transmission of information will soon be used in large scale transmission systems for television and radio broadcasts as well as for encoding and playback of audio and video from such media as digital compact cassette and minidisc.

The Motion Pictures Expert Group (MPEG) has promulgated the MPEG audio and video standards for compression and decompression algorithms to be used in the digital transmission and receipt of audio and video broadcasts in ISO-11172 (hereinafter the "MPEG Standard"). The MPEG Standard provides for the efficient compression of data according to an established psychoacoustic model to enable real time transmission, decompression and broadcast of CD-quality sound and video images. The MPEG standard has gained wide acceptance in satellite broadcasting, CD-ROM publishing, and DAB. The MPEG Standard is useful in a variety of products including digital compact cassette decoders and encoders, and minidisc decoders and encoders, for example. In addition, other audio standards, such as the Dolby AC-3 standard, involve the encoding and decoding of audio and video data transmitted in digital format.

The AC-3 standard has been adopted for use on laser disc, digital video disk (DVD), the US ATV system, and some emerging digital cable systems. The two standards potentially have a large overlap of application areas.

Both of the standards are capable of carrying up to five full channels plus one bass channel, referred to as "5.1 channels," of audio data and incorporate a number of variants including sampling frequencies, bit rates, speaker configurations, and a variety of control features. However, the standards differ in their bit allocation algorithms, transform length, control feature sets, and syntax formats.

Both of the compression standards are based on psychoacoustics of the human perception system. The input digital audio signals are split into frequency subbands using an analysis filter bank. The subband filter outputs are then downsampled and quantized using dynamic bit allocation in such a way that the quantization noise is masked by the sound and remains imperceptible. These quantized and coded samples are then packed into audio frames that conform to the respective standard's formatting requirements. For a 5.1 channel system, high quality audio can be obtained for compression ratio in the range of 10:1.

The transmission of compressed digital data uses a data stream that may be received and processed at rates up to 15 megabits per second or higher. Prior systems that have been used to implement the MPEG decompression operation and other digital compression and decompression operations have required expensive digital signal processors and extensive support memory. Other architectures have involved large amounts of dedicated circuitry that are not easily adapted to new digital data compression or decompression applications.

An object of the present invention is provide an improved apparatus and methods of processing MPEG, AC-3 or other streams of data.

Other objects and advantages will be apparent to those of ordinary skill in the art having reference to the following figures and specification.

SUMMARY OF THE INVENTION

In general, and in a form of the present invention a data processing device is provided that has a plurality of processing units wherein each of the processing units has an associated instruction memory and wherein each of the processing units is operable to execute instructions retrieved from the respective associated instruction memory simultaneously. A data bus is connected to each of the plurality of processing units and to a memory circuit, and the data is bus operable to transfer data between each of the plurality of processing units and the memory circuit, such that a first of the plurality of processing units is operable to store a first data word in the memory circuit and a second of the plurality of processing units is operable to read the first data word from the memory circuit. There is a first instruction sequencer in the first processing unit and a second instruction sequencer in the second processing unit. There is also instruction interconnect circuitry that is operable to transfer a first instruction directive from the first instruction sequencer to the second instruction sequencer The second instruction sequencer in the second processing unit is operable to begin processing a first sequence of instructions selected from the associated instruction memory in response to the first instruction directive.

In another form of the present invention, signaling means are provided for informing the first processing unit that the second processing unit has completed the first predetermined instruction sequence.

In another form of the present invention, the first instruction sequencer in the first processing unit is operable to execute an instruction from the associated instruction memory by sending a second instruction directive to the second instruction sequencer and by controlling a first data interconnect circuit and a second data interconnect circuit such that the second arithmetic circuit operationally replaces the first arithmetic circuit.

In another form of the present invention, a power control circuit is provided that is operational to cause the second processing unit to enter a low power mode in response to a predetermined instruction decoded by the second instruction sequencer. The power control circuit is also operational to restore the second processing unit to a full power mode in response to detecting the first instruction directive.

Other embodiments of the present invention will be evident from the description and drawings.

BRIEF DESCRIPTION OF THE DRAWINGS

Other features and advantages of the present invention will become apparent by reference to the following detailed description when considered in conjunction with the accompanying drawings, in which.

Corresponding numerals and symbols in the different figures and tables refer to corresponding parts unless otherwise indicated.

DETAILED DESCRIPTION OF THE INVENTION

Aspects of the present invention include methods and apparatus for processing and decompressing an audio data stream. In the following description, specific information is set forth to provide a thorough understanding of the present invention. Well known circuits and devices are included in block diagram form in order not to complicate the description unnecessarily. Moreover, it will be apparent to one skilled in the art that specific details of these blocks are not required in order to practice the present invention.

The present invention comprises a system that is operable to efficiently decode a stream of data that has been encoded and compressed using any of a number of encoding standards, such as those defined by the Moving Pictures Expert Group (MPEG-1 or MPEG-2), or the Digital Audio Compression Standard (AC-3), for example. In order to accomplish the real time processing of the data stream, the system of the present invention must be able to receive a bit stream that can be transmitted at variable bit rates up to 15 megabits per second and to identify and retrieve a particular audio data set that is time multiplexed with other data within the bit stream. The system must then decode the retrieved data and present conventional pulse code modulated (PCM) data to a digital to analog converter which will, in turn, produce conventional analog audio signals with fidelity comparable to other digital audio technologies. The system of the present invention must also monitor synchronization within the bit stream and synchronization between the decoded audio data and other data streams, for example, digitally encoded video images associated with the audio which must be presented simultaneously with decoded audio data. In addition, MPEG or AC-3 data streams can also contain ancillary data which may be used as system control information or to transmit associated data such as song titles or the like. The system of the present invention must recognize ancillary data and alert other systems to its presence.

Figure 1:
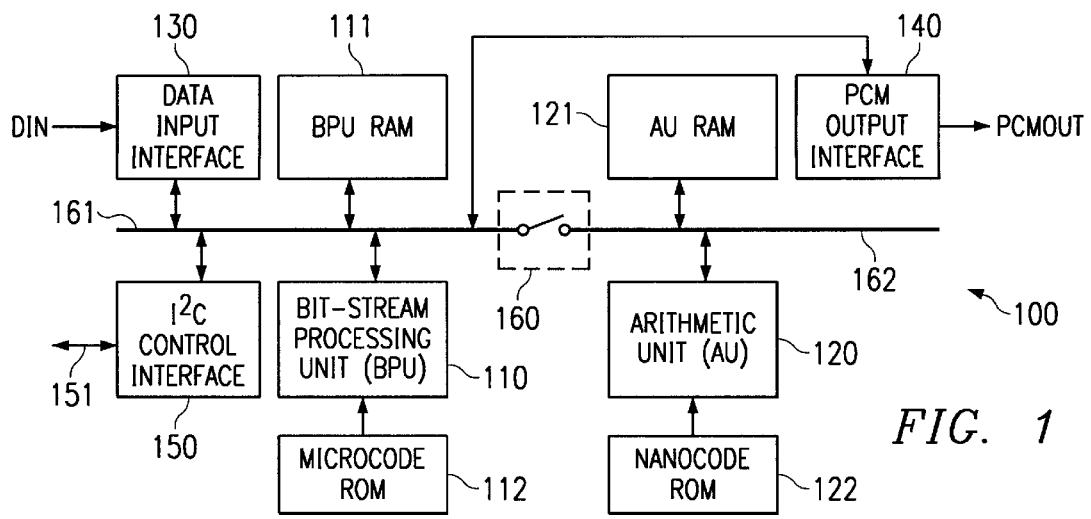
FIG. 1 is a block diagram of a data processing device constructed in accordance with aspects of the present invention.

In order to appreciate the significance of aspects of the present invention, the architecture and general operation of a data processing device which meets the requirements of the preceding paragraph will now be described. Referring to FIG. 1, which is a block diagram of a data processing device 100 constructed in accordance with aspects of the present invention, the architecture of data processing device 100 is illustrated. The architectural hardware and software implementation reflect the two very different kinds of tasks to be performed by device 100: decoding and synthesis. In order to decode a steam of data, device 100 must unpack variable length encoded pieces of information from the stream of data. Additional decoding produces set of frequency coefficients. The second task is a synthesis filter bank that converts the frequency domain coefficients to PCM data. In addition, device 100 also needs to support dynamic range compression, downmixing, error detection and concealment, time synchronization, and other system resource allocation and management functions.

The design of device 100 includes two autonomous processing units working together through shared memory supported by multiple I/O modules. The operation of each unit is data-driven. The synchronization is carried out by the Bit-stream Processing Unit (BPU) which acts as the master processor. Bit-stream Processing Unit (BPU) 110 has a RAM 111 for holding data and a ROM 112 for holding instructions which are processed by BPU 110. Likewise, Arithmetic Unit (AU) 120 has a RAM 121 for holding data and a ROM 122 for holding instructions which are processed by AU 120. Data input interface 130 receives a stream of data on input lines DIN which is to be processed by device 100. PCM output interface 140 outputs a stream of PCM data on output lines PCMOUT which has been produced by device 100. Inter-Integrated Circuit ($I^2C$) Interface 150 provides a mechanism for passing control directives or data parameters on interface lines 151 between device 100 and other control or processing units, which are not shown, using a well known protocol. Bus switch 160 selectively connects address/data bus 161 to address/data bus 162 to allow BPU 110 to pass data to AU 120.

Figure 2:
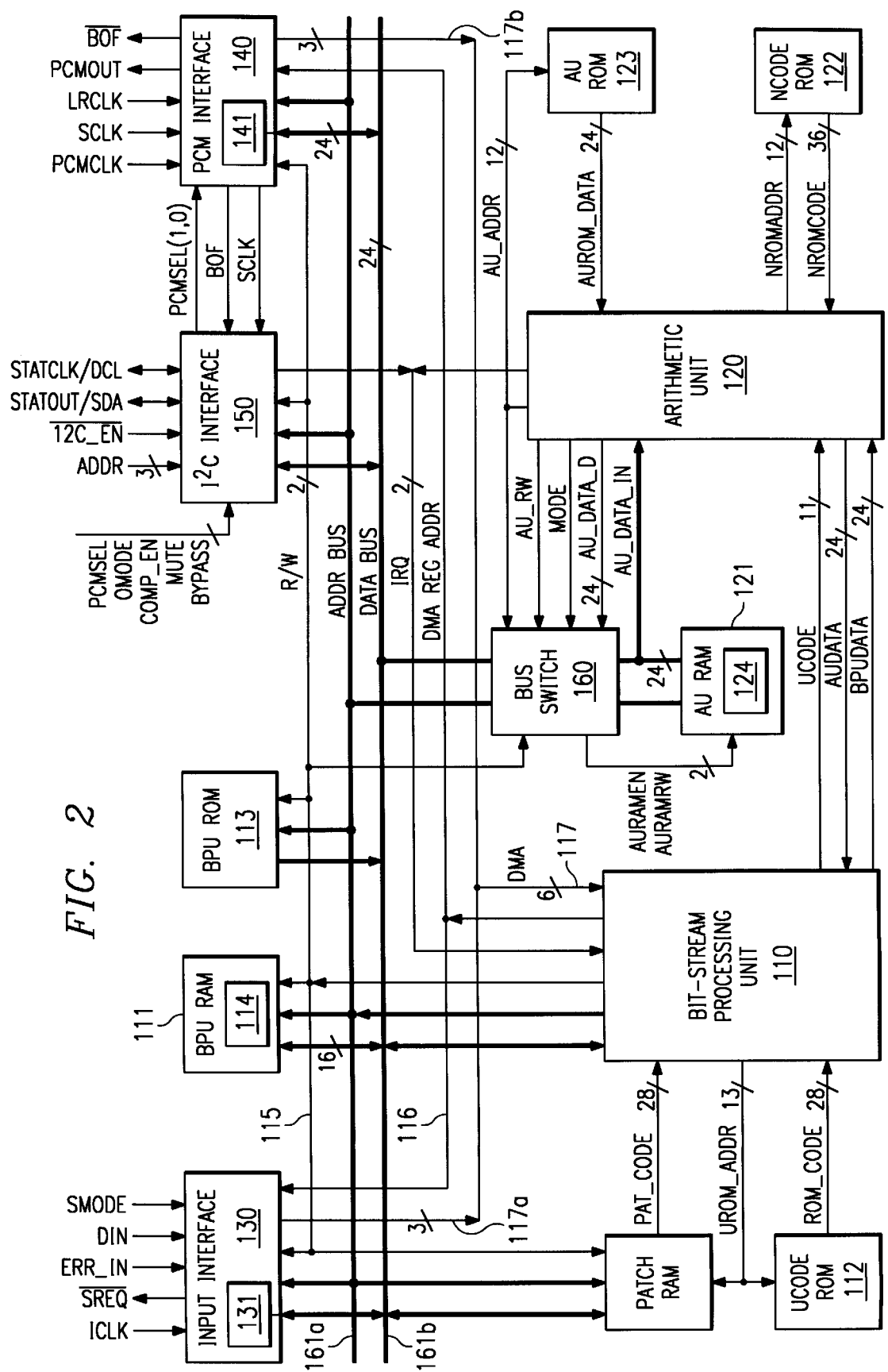
FIG. 2 is a more detailed block diagram of the data processing device of FIG. 1, illustrating interconnections of a Bit-stream Processing Unit and an Arithmetic Unit.

FIG. 2 is a more detailed block diagram of the data processing device of FIG. 1, illustrating interconnections of Bit-stream Processing Unit 110 and Arithmetic Unit 120. A BPU ROM 113 for holding data and coefficients and an AU ROM 123 for holding data and coefficients is also shown.

A typical operation cycle is as follows: Coded data arrives at the Data Input Interface 130 asynchronous to device 100's system clock, which operates at 27 MHz. Data Input Interface 130 synchronizes the incoming data to the 27 MHz device clock and transfers the data to a buffer area 114 in BPU memory 111 through a direct memory access (DMA) operation. BPU 110 reads the compressed data from buffer 114, performs various decoding operations, and writes the unpacked frequency domain coefficients to AU RAM 121, a shared memory between BPU and AU. Arithmetic Unit 120 is then activated and performs subband synthesis filtering, which produces a stream of reconstructed PCM samples which are stored in output buffer area 124 of AU RAM 121. PCM Output Interface 140 receives PCM samples from output buffer 124 through a DMA transfer and then formats and outputs them to an external D/A converter. Additional functions performed by the BPU include control and status I/O, as well as overall system resource management.

Figure 3:
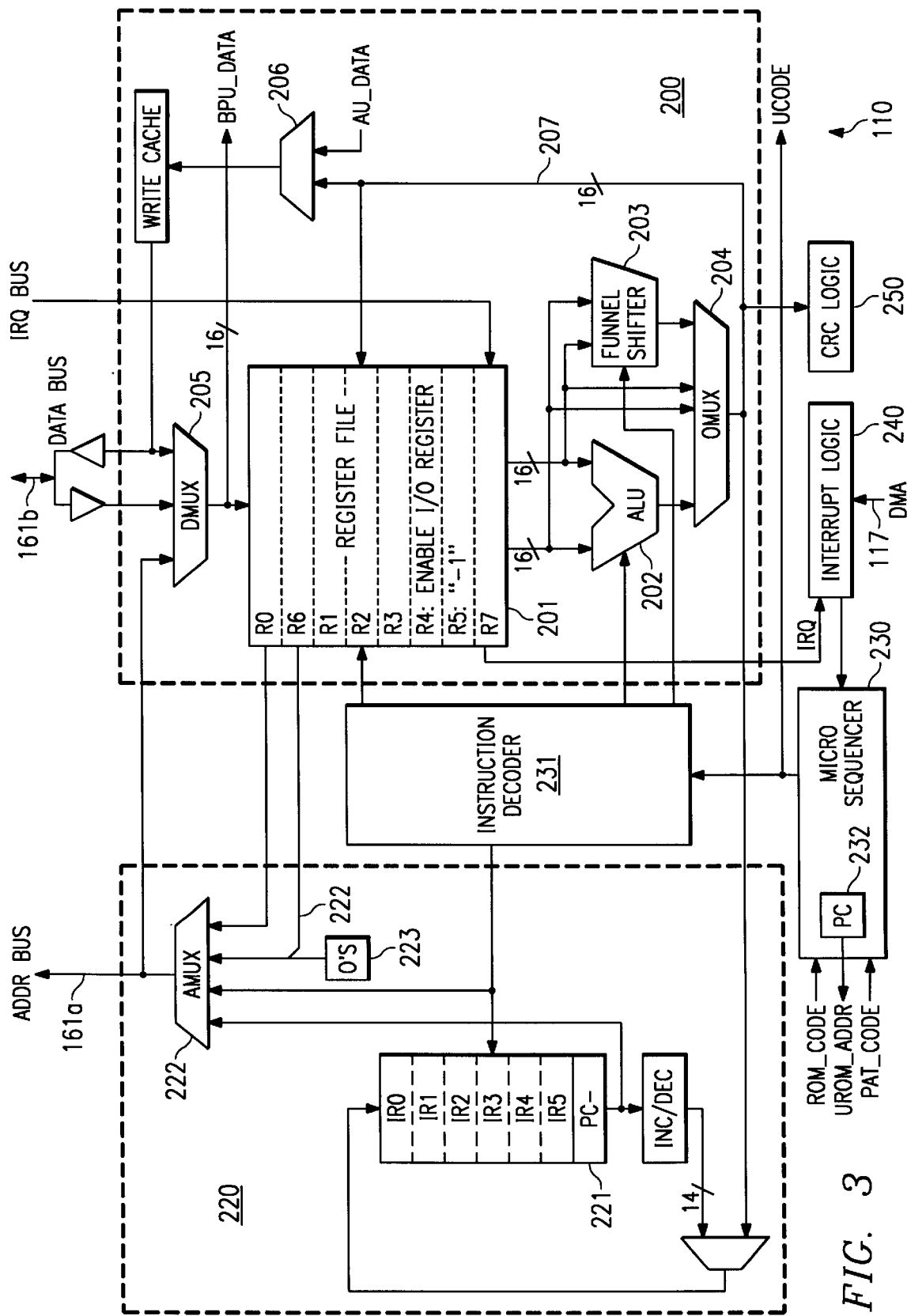
FIG. 3 is a block diagram of the Bit-stream Processing Unit of FIG. 2.

FIG. 3 is a block diagram of the Bit-stream Processing Unit of FIG. 2. BPU 110 is a programmable processor with hardware acceleration and instructions customized for audio decoding. It is a 16-bit reduced instruction set computer (RISC) processor with a register-to-register operational unit 200 and an address generation unit 220 operating in parallel. Operational unit 200 includes a register file 201, an arithmetic/logic unit 202 which operates in parallel with a funnel shifter 203 on any two registers from register file 201, and an output multiplexer 204 which provides the results of each cycle to input mux 205 which is in turn connected to register file 201 so that a result can be stored into one of the registers.

BPU 110 is capable of performing an ALU operation, a memory I/O, and a memory address update operation in one system clock cycle. Three addressing modes: direct, indirect, and registered are supported. Selective acceleration is provided for field extraction and buffer management to reduce control software overhead. Table 1 is a list of the instruction set.

TABLE 1

BPU Instruction Set

| Instruction Mnemonics | Functional Description |
| --- | --- |
| And | Logical and |
| Or | Logical or |
| cSat | Conditional saturation |
| Ash | Arithmetic shift |
| LSh | Logical shift |
| RoRc | Rotate right with carry |
| GBF | Get bit-field |
| Add | Add |
| AddC | Add with carry |
| cAdd | Conditional add |
| Xor | Logical exclusive or |
| Sub | Subtract |
| SubB | Subtract with borrow |
| SubR | Subtract reversed |
| Neg | 2's complement |
| cNeg | Conditional 2's complement |
| Bcc | Conditional branch |
| DBcc | Decrement & conditional branch |
| IOST | IO reg to memory move |
| IOLD | Memory to IO reg move |
| auOp | AU operation - loosely coupled |
| auEx | AU execution - tightly coupled |
| Sleep | Power down unit |

BPU 110 has two pipeline stages: Instruction Fetch/Predecode which is performed in Micro Sequencer 230, and Decode/Execution which is performed in conjunction with instruction decoder 231. The decoding is split and merged with the Instruction Fetch and Execution respectively. This arrangement reduces one pipeline stage and thus branching overhead. Also, the shallow pipe operation enables the processor to have a very small register file (four general purpose registers, a dedicated bit-stream address pointer, and a control/status register) since memory can be accessed with only a single cycle delay.

Figure 4:
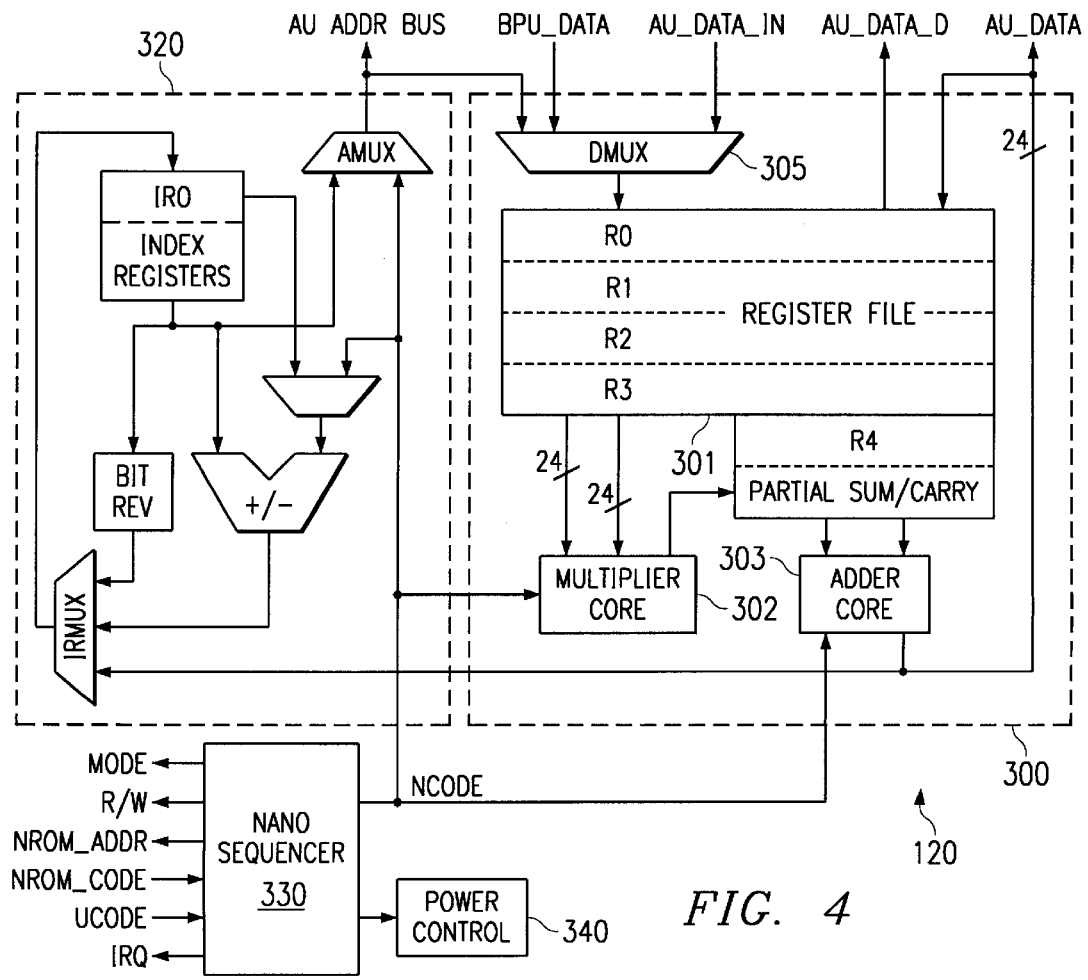
FIG. 4 is a block diagram of the Arithmetic Unit of FIG. 2.

FIG. 4 is a block diagram of the Arithmetic Unit of FIG. 2. Arithmetic unit 120 is a programmable fixed point math processor that performs the subband synthesis filtering. A complete description of subband synthesis filtering is provided in U.S. Pat. No. 5,644,310, (U.S. patent application Ser. No. 08/475,251 entitled *Integrated Audio Decoder System And Method Of Operation* or U.S. patent application Ser. No. 08/054,768 now U.S. Pat. No. 5,657,423 entitled *Hardware Filter Circuit And Address Circuitry For MPEG Encoded Data*, both assigned to the assignee of the present application), which is included herein by reference; in particular, FIGS. 7–9 and 11–31 and related descriptions.

The AU 120 module receives frequency domain coefficients from the BPU by means of shared AU memory 121. After the BPU has written a block of coefficients into AU memory 121, the BPU activates the AU through a coprocessor instruction, auOp. BPU 110 is then free to continue decoding the audio input data. Synchronization of the two processors is achieved through interrupts, using interrupt circuitry 240 (shown in FIG. 3).

AU 120 is a 24-bit RISC processor with a register-to-register operational unit 300 and an address generation unit 320 operating in parallel. Operational unit 300 includes a register file 301, a multiplier unit 302 which operates in conjunction with an adder 303 on any two registers from register file 301. The output of adder 303 is provided to input mux 305 which is in turn connected to register file 301 so that a result can be stored into one of the registers.

A bit-width of 24 bits in the data path in the arithmetic unit was chosen so that the resulting PCM audio will be of superior quality alter processing. The width was determined by comparing the results of fixed point simulations to the results of a similar simulation using double-precision floating point arithmetic. In addition, double-precision multiplies are performed selectively in critical areas within the subband synthesis filtering process.

Figure 5:
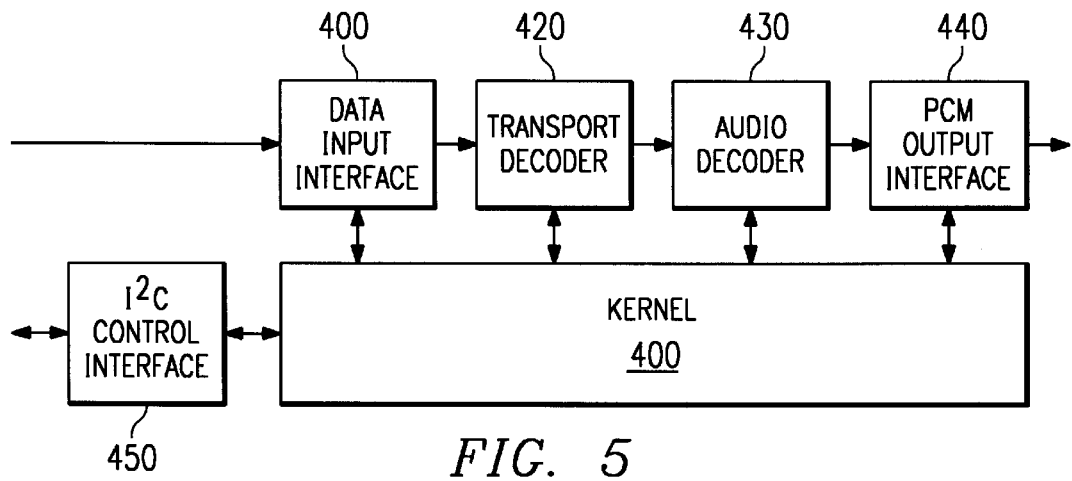
FIG. 5 is a block diagram illustrating the architecture of the software which operates on the device of FIG. 1.

FIG. 5 is a block diagram illustrating the architecture of the software which operates on data processing device 100. Each hardware component in device 100 has an associated software component, including the compressed bit-stream input, audio sample output, host command interface, and the audio algorithms themselves. These components are overseen by a kernel that provides real-time operation using interrupts and software multi-tasking.

The software architecture block diagram is illustrated in FIG. 5. Each of the blocks corresponds to one system software task. These tasks run concurrently and communicate via global memory 111. They are scheduled according to priority, data availability, and synchronized to hardware using interrupts. The concurrent data-driven model reduces RAM storage by allowing the size of a unit of data processed to be chosen independently for each task.

The software operates as follows. Data Input Interface 410 buffers input data and regulates flow between the external source and the internal decoding tasks. Transport Decoder 420 strips out packet information from the input data and emits a raw AC-3 or MPEG audio bit-stream, which is processed by Audio Decoder 430. PCM Output Interface 440 synchronizes the audio data output to a system-wide absolute time reference and, when necessary, attempts to conceal bit-stream errors. I$^2$C Control Interface 450 accepts configuration commands from an external host and reports device status. Finally, Kernel 400 responds to hardware interrupts and schedules task execution.

Figure 6:
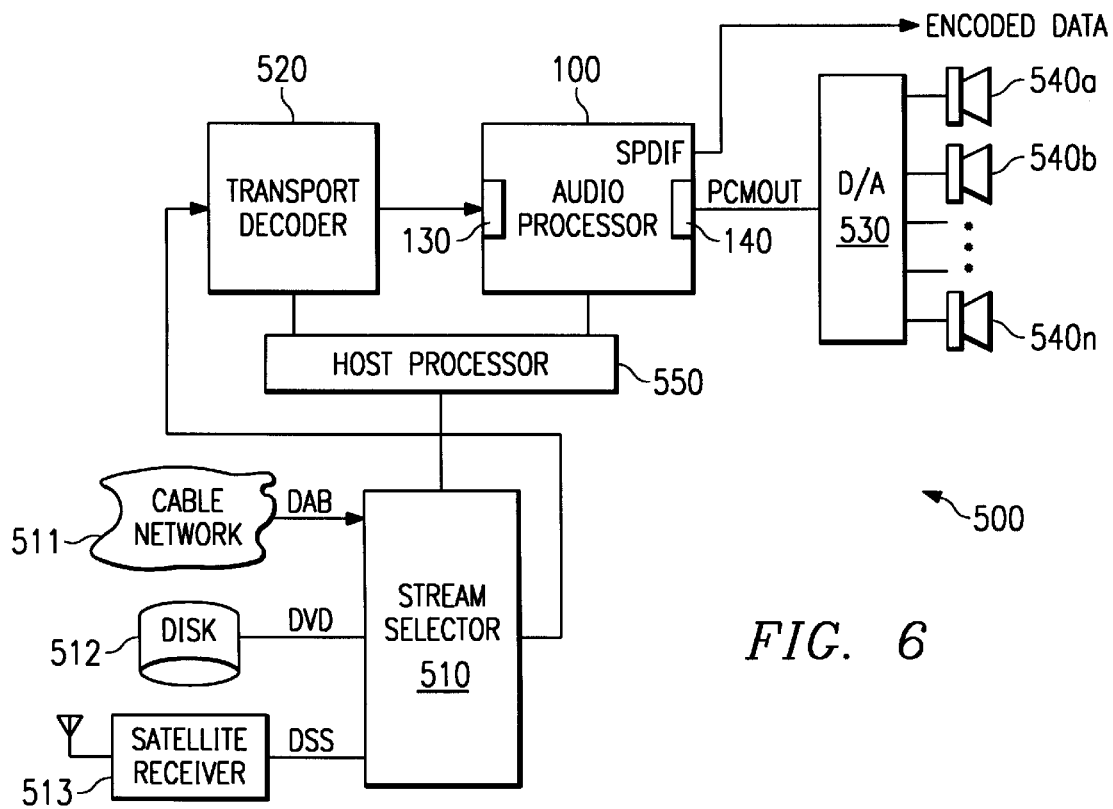
FIG. 6 is a block diagram illustrating an audio reproduction system which includes the data processing device of FIG. 1.

FIG. 6 is a block diagram illustrating an audio reproduction system 500 which includes the data processing device of FIG. 1. Stream selector 510 selects a transport data stream from one or more sources, such as a cable network system 511, digital video disk 512, or satellite receiver 513, for example. A selected stream of data is then sent to transport decoder 520 which separates a stream of audio data from the transport data stream according to the transport protocol, such as MPEG or AC-3, for that stream. Transport decoder typically recognizes a number of transport data stream formats, such as direct satellite system (DSS), digital video disk (DVD), or digital audio broadcasting (DAB), for example. The selected audio data stream is then sent to data processing device 100 via input interface 130. Device 100 unpacks, decodes, and filters the audio data stream, as discussed previously, to form a stream of PCM data which is passed via PCM output interface 140 to D/A device 530. D/A device 530 then forms at least one channel of analog data which is sent to a speaker subsystem 540*a*. Typically, A/D 530 forms two channels of analog data for stereo output into two speaker subsystems 540*a* and 540*b*. Processing device 100 is programmed to downmix an MPEG-2 or AC-3 system with more than two channels, such as 5.1 channels, to form only two channels of PCM data for output to stereo speaker subsystems 540*a* and 540*b*.

Alternatively, processing device 100 can be programmed to provide up to six channels of PCM data for a 5.1 channel sound reproduction system if the selected audio data stream conforms to MPEG-2 or AC-3. In such a 5.1 channel system, D/A 530 would form six analog channels for six speaker subsystems 540*a*–*n*. Each speaker subsystem 540 contains at least one speaker and may contain an amplification circuit (not shown) and an equalization circuit (not shown).

The SPDIF (Sony/Philips Digital Interface Format) output of device 100 conforms to a subset of the Audio Engineering Society's AES3 standard for serial transmission of digital audio data. The SPDIF format is a subset of the minimum implementation of AES3. This stream of data can be provided to another system (not shown) for further processing or re-transmission.

Figure 7:
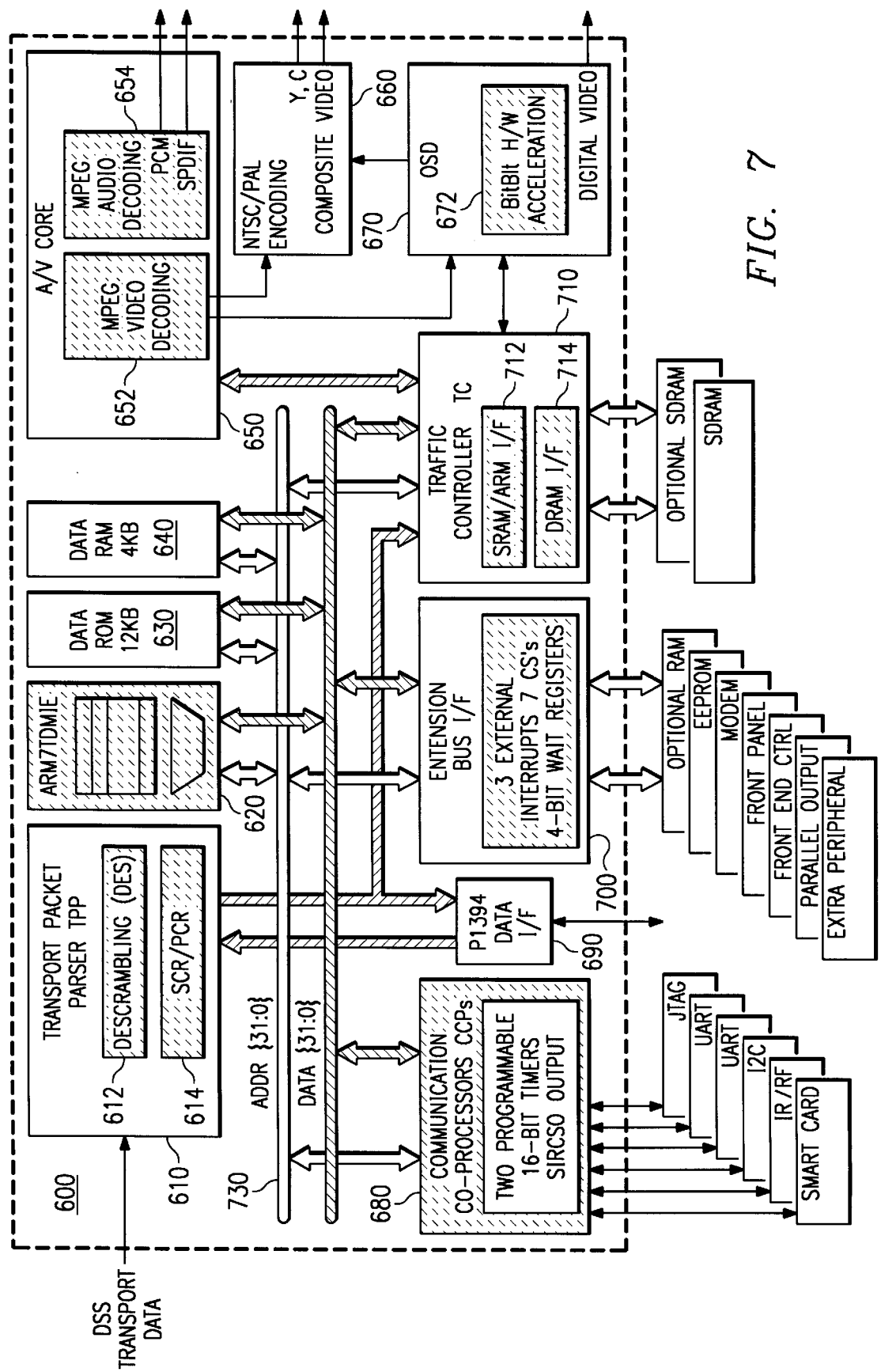
FIG. 7 is a block diagram of an integrated circuit which includes the data processing device of FIG. 1 in combination with other data processing devices, the integrated circuit being connected to various external devices.

Referring now to FIG. 7 there may be seen a functional block diagram of a circuit 300 that forms a portion of an audio-visual system which includes aspects of the present invention. More particularly, there may be seen the overall functional architecture of a circuit including on-chip interconnections that is preferably implemented on a single chip as depicted by the dashed line portion of FIG. 7. As depicted inside the dashed line portion of FIG. 7, this circuit consists of a transport packet parser (TPP) block 610 that includes a bit-stream decoder or descrambler 612 and clock recovery circuitry 614, an ARM CPU block 620, a data ROM block 630, a data RAM block 640, an audio/video (A/V) core block 650 that includes an MPEG-2 audio decoder 654 and an MPEG-2 video decoder 652, an NTSC/PAL video encoder block 660, an on screen display (OSD) controller block 670 to mix graphics and video that includes a bit-blt hardware (H/W) accelerator 672, a communication coprocessor (CCP) block 680 that includes connections for two UART serial data interfaces, infra red (IR) and radio frequency (RF) inputs, SIRCS input and output, an I²C port and a Smart Card interface, a P1394 interface (I/F) block 690 for connection to an external 1394 device, an extension bus interface (I/F) block 700 to connect peripherals such as additional RS232 ports, display and control panels, external ROM, DRAM, or EEPROM memory, a modem and an extra peripheral, and a traffic controller (TC) block 710 that includes an SRAM/ARM interface (I/F) 712 and a DRAM I/F 714. There may also be seen an internal 32 bit address bus 320 that interconnects the blocks and seen an internal 32 bit data bus 730 that interconnects the blocks. External program and data memory expansion allows the circuit to support a wide range of audio/video systems, especially, as for example, but not limited to set-top boxes, from low end to high end.

The consolidation of all these functions onto a single chip with a large number of communications ports allows for removal of excess circuitry and/or logic needed for control and/or communications when these functions are distributed among several chips and allows for simplification of the circuitry remaining after consolidation onto a single chip. Thus, audio decoder 354 is the same as data processing device 100 with suitable modifications of interfaces 130, 140, 150 and 170. This results in a simpler and cost-reduced single chip implementation of the functionality currently available only by combining many different chips and/or by using special chipsets.

Figure 8A:
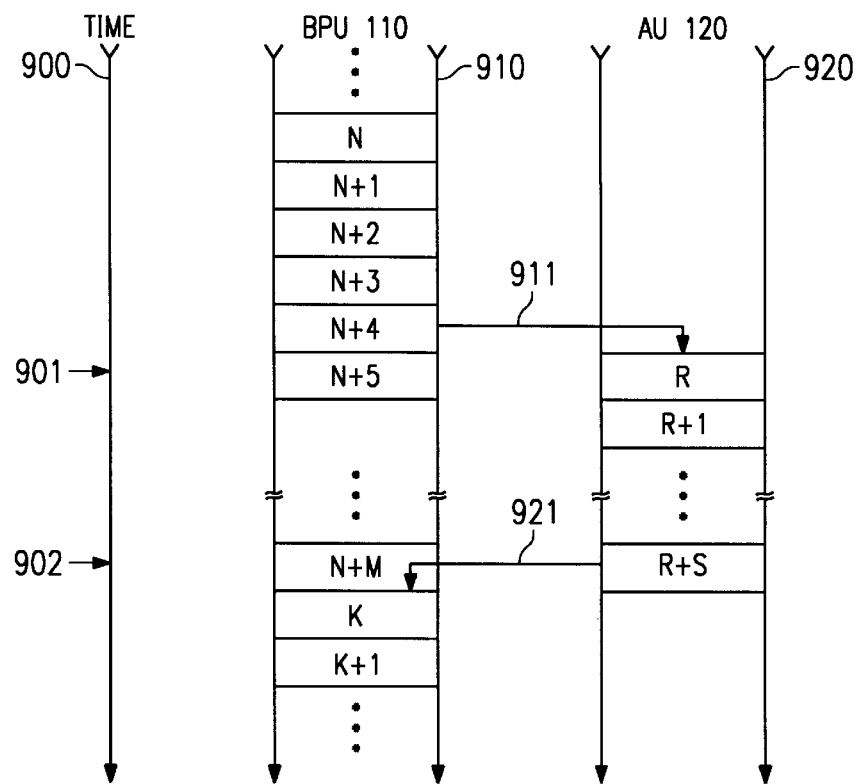
FIGS. 8A and 8B are time-lines illustrating parallel processing by the two processing units of FIG. 2, where the second processing unit operates in response to a directive from the first processing unit, according to an aspect of the present invention.

A novel aspect of data processing device 100 will now be discussed in detail, with reference to FIGS. 8A and 8B, which are timelines illustrating parallel processing by the two processing units of FIG. 2, where the second processing unit operates in response to a directive from the first processing unit, according to an aspect of the present invention. Referring to FIG. 8A, line 900 represents wall clock time. Timeline 910 represents instruction processing in BPU 110 (FIG. 2), while timeline 920 represents instruction processing in AU 120 (FIG. 2). BPU 110 processes a sequence of instructions, referred to as micro-instructions, beginning with instruction N. Prior to this sequence, BPU 110 was processing other instruction sequences. This sequence may be sequentially addressed instructions, or one or more branches may be included; this is not material to this aspect of the invention. At time 901, BPU 110 executes instruction N+4, which sends a directive 911 to AU 120 to begin processing a stream of instructions starting with instruction R. Instructions executed by AU 120 are referred to as Nano-instructions, and are defined in Appendix A.

AU 120 processes instruction R on the next clock cycle while BPU 110 executes instruction N+5. Parallel processing operation continues until AU 120 executes instruction R+S at time 902. Instruction R+S is a NAP_int instruction that instructs AU 120 to stop processing new instructions. AU 120 then signals BPU 110 via signaling means 921 that the directed sequence of nano-instructions has been completed. AU 120 then falls into a quiescent mode and waits for another directive. Meanwhile, BPU 110 responds to signaling means 921 and executes a sequence of micro-instructions beginning with instruction K. BPU 110 continues processing instructions while AU is quiescent.

Referring again to FIGS. 3 and 4, Micro Sequencer 230 in BPU 110 receives each micro-instruction in the instruction sequence and sends a portion of each micro-instruction to Nano Sequencer 330 in AU 120 as an instruction directive. Nano Sequencer 330 examines each instruction directive, but acts only on certain ones that have been predefined to be of interest to AU 120. Thus, for selected instruction directive 911, AU 120 responds and begins executing a sequence of nano-instructions specified by instruction directive 961. When the NAP_int instruction is executed, Nano Sequencer 330 embodies signaling means 971 by asserting an interrupt signal IRQ which causes an interrupt in BPU 110. Thus, AU 120 has advantageously executed an instruction sequence in parallel with BPU 110 in a loosely coupled manner.

Figure 8B:
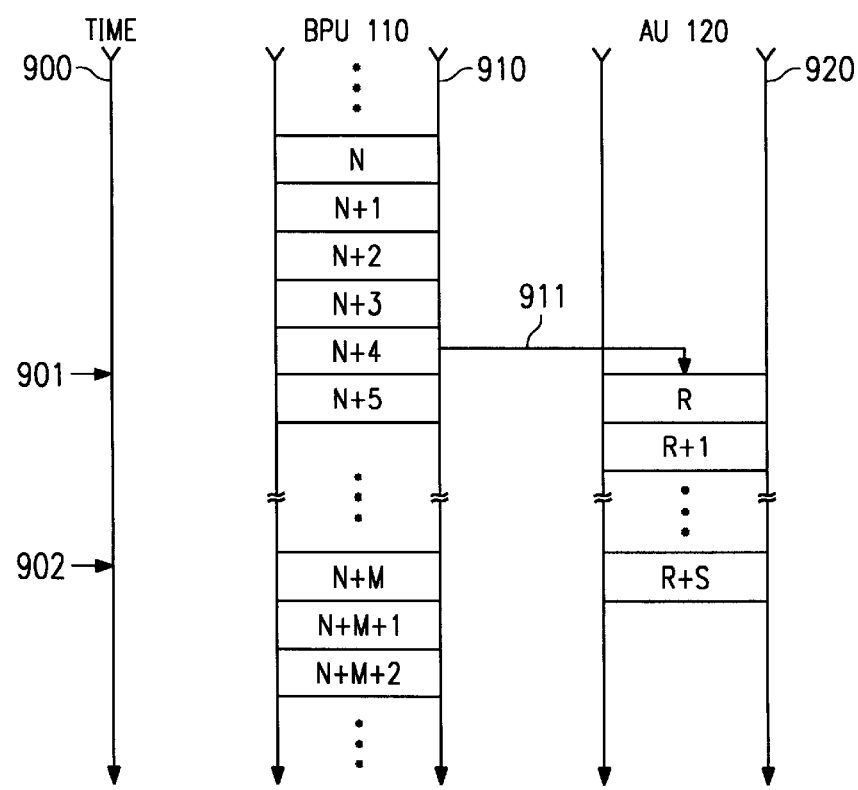

Referring to FIG. 8B, a similar time-line is shown as in FIG. 8A, except in this case instruction R+S is a NAP instruction, which does not send a signal to BPU 110. BPU 110 knows how long AU 120 takes to execute a sequence of instructions in response to an auOp instruction directive. Thus, anytime after time 902 BPU 110 can access a data value which AU 120 has stored in memory 121 as a result of executing a requested sequence of instructions.

Figure 9:
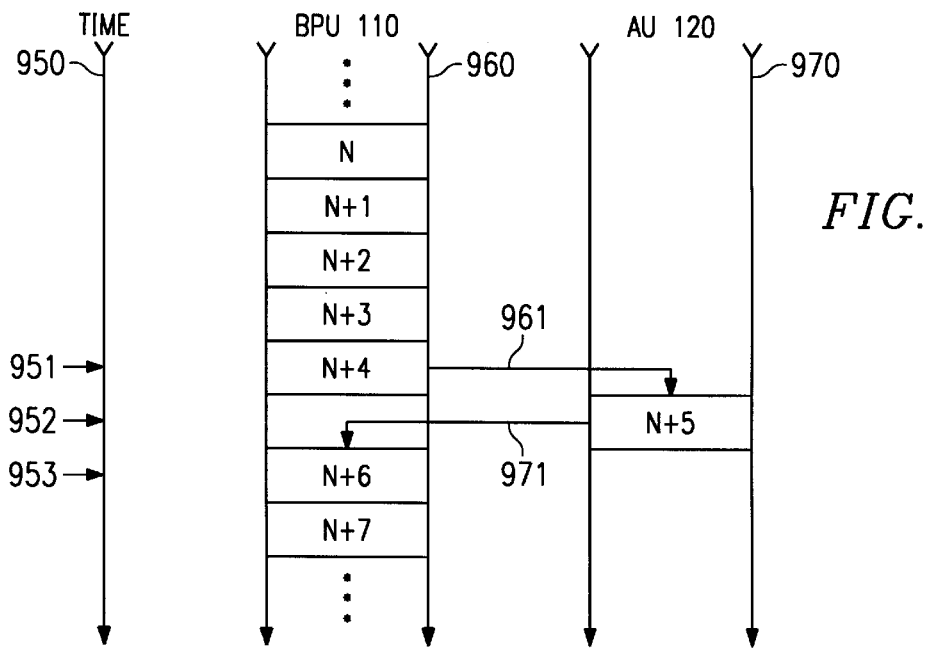
FIG. 9 is a time-line illustrating a single thread of processing performed on the two processing units of FIG. 2, according to an aspect of the present invention.

FIG. 9 is a timeline illustrating a single thread of processing performed on the two processing units of FIG. 2, according to another aspect of the present invention. As before, timeline 960 represents instruction processing in BPU 110 (FIG. 2), while timeline 970 represents instruction processing in AU 120 (FIG. 2). BPU 110 processes a sequence of instructions beginning with instruction N. Prior to this sequence, BPU 110 was processing other instruction sequences. This sequence may be sequentially addressed instructions, or one or more branches may be included; this is not material to this aspect of the invention. At time 951, BPU 110 executes instruction N+4, which sends an instruction directive 961 to AU 120 to configure a data path so that arithmetic unit 300 (FIG. 4) is interconnected with BPU 110 in such a manner that arithmetic unit 300 of AU 120 operationally replaces arithmetic unit 200 (FIG. 3) of BPU 110 for one instruction execution cycle. However, BPU advantageously continues to use address generation unit 220 during this instruction cycle. This will be explained in more detail with reference to FIGS. 10A, 10B and 10C.

Referring again to FIGS. 3 and 4, AU 120 has a data mux 305 which is configured to pass data bus BPU_Data in place of AU_Data_In in response to directive 961. Likewise, BPU 110 has a data mux 206 which is also configured in response to directive 961 to pass data bus AU_Data instead of bus 207. Micro sequencer 230 in BPU 110 receives each micro-instruction in the micro-instruction sequence and sends a portion of each micro-instruction to Nano Sequencer 330 in AU 120 as an instruction directive. Nano Sequencer 330 examines each instruction directive, but acts only on certain ones that have been predefined to be of interest, such as instruction directive 961. Thus, for one instruction execution cycle of a preselected instruction, register file 201, ALU 202 and shifter 203 are operationally replaced by register file 301, multiplier 302 and adder 303. This lets BPU 110 advantageously execute an instruction using resources from another processing unit in a tightly coupled manner.

Referring again to FIG. 3, BPU forms directive 911 (FIG. 8) and directive 961 (FIG. 9) in response to decoding a micro-instruction in instruction decoder 231. Control signals are sent to mux 206 and mux 305 as needed for tightly coupled execution. An interrupt request IRQ is received by interrupt circuit 240 for loosely coupled execution.

Referring back to Table 1, one type of BPU instruction is "auOP." Table 2 describes various forms of the auOP instruction. For each type of auOP instruction, Nano Sequencer 330 of AU 120 selects a different nano-instruction sequence from nCode ROM 122, as specified by the "CODE" field which is placed in the immediate field of the auOP instruction. The value of the CODE field is actually the address of the first instruction in a sequence of nano-instructions in nCode ROM 122. However, for other embodiments, other means of correlating an auOP instruction can be used, such as index values, an encoded field, etc.

TABLE 2

AU OP Field Codes

| CODE | MNEMONIC | DESCRIPTION |
| --- | --- | --- |
| address 1 | MUL | multiply |
| address 2 | ADD | add |
| address 3 | SUB | subtract |
| address 4 | BTF | butterfly |
| address 5 | FFT64 | 64 point Fourier transform |
| address 6 | FFT128 | 128 point Fourier transform |
| address 7 | FIR | FIR filter |
| address 8 | MPEGDCT | MPEG DCT |
| address 9 | AC3DCT | AC3 DCT |

Another novel aspect of data processing device 100 will now be discussed in detail, with reference to FIG. 10A which illustrates instruction formats for BPU 110. As discussed previously with reference to FIG. 9, BPU 110 can operate in a tightly coupled manner with AU 120 for selected BPU instructions. These instructions are indicated in Table 1 as auEx instructions. Several opcodes are selected to specify various tightly coupled functions. Advantageously, BPU can still perform memory operations and form register source/destination selections as specified in the BPU instruction; however, the selected register(s) is in register file 301 of AU 120.

Figure 10A:
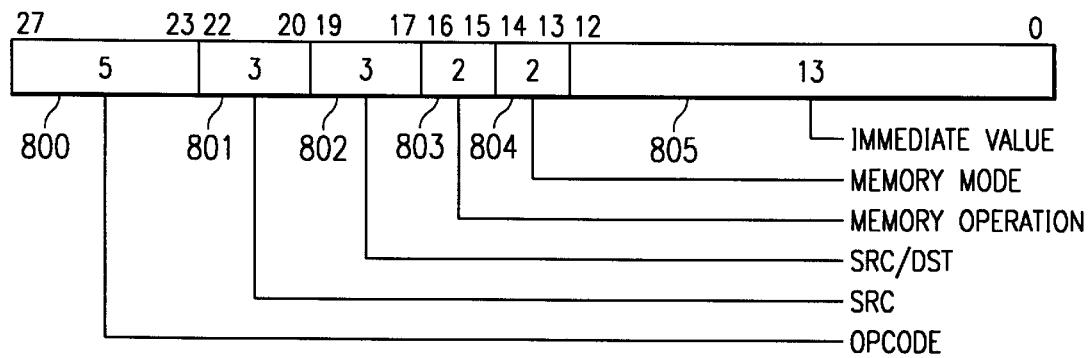
FIG. 10A illustrates an instruction format for the BPU of FIG. 2.

FIG. 10A illustrates the format for arithmetic and logical instructions, such as ADD, AND, OR, etc. from Table 1. BPU instructions can specify one BPU operation and one memory operation. The possible combinations of BPU and memory are:

BPU operation into BPU register, and memory load into BPU register. The destination of the memory load may not be the same register as the BPU destination.

BPU operation into memory

BPU operation into index register

The sources of an BPU operation can be any BPU register. If the destination is a register, then it is one of the source registers. If the destination is memory or an index register, then the result is not loaded into the BPU register file.

The destination of a memory load is always one of two BPU registers, either R0 or R1. To load multiple BPU registers in sequence, an BPU operation can be pipelined to move the previously loaded value into its correct location, concurrently with the read. The purpose in restricting the registers that can be loaded into is to minimize the number of registers that have more than one source for a load.

Opcode field 800 defines the operation of the instruction. Several opcodes are selected to specify various tightly coupled functions, as illustrated in Table 3. The opcode field is passed to Nano Sequencer 330 as part of an instruction directive. Source field 801 and source/destination field 802 specify the source and destination registers from register file 201, as shown in Table 4. Memory operation field 803 specifies a memory operation, as shown in Table 5. Memory mode field 804 specifies the addressing mode of a memory operation, as shown in Table 6. Addressing modes will be discussed in more detail later with respect to FIGS. 10B and 10C. field 805 contains a value that is used as data or an address, depending on the instruction.

TABLE 3

AuEx Opcodes

| CODE | MNEMONIC |
| --- | --- |
| 11000 | AUMOVE |
| 11001 | AUADD |
| 11010 | AUSUB |
| 11011 | AUMULT1 |
| 11100 | AUMULT2 |
| 11101 | reserved |
| 11110 | reserved |
| 11111 | reserved |

TABLE 4

ALU SRC and SRC/DST Field Codes

| CODE | MNEMONIC | DESCRIPTION |
| --- | --- | --- |
| 000 | R0 | ALU register 0 |
| 001 | R1 | ALU register 1 |
| 010 | R2 | ALU register 2 |
| 011 | R3 | ALU register 3 |

TABLE 4-continued

ALU SRC and SRC/DST Field Codes

| CODE | MNEMONIC | DESCRIPTION |
|---|---|---|
| 100 | EN | I/O enable register |
| 101 | −1 | constant value of all ones |
| 110 | BIT | bit address pointer |
| 111 | ST | status register |

TABLE 5

MEM OP Field Codes

| CODE | MNEMONIC | DESCRIPTION |
|---|---|---|
| 00 | NOP | no memory operation |
| 01 | ST | store ALU result to memory |
| 10 | LD0 | load immed/memory into R0 |
| 11 | LD1 | load immed/memory into R1 |

TABLE 6

MEM Mode Field Codes

| CODE | MNEMONIC | DESCRIPTION |
|---|---|---|
| 00 | val( ) | immediate value |
| 01 | mem( ) | direct memory address |
| 10 | atbl( ) | register IRx or R0 or R6 |
| 11 | tbl( ) | indirect via IRx or R0 or R6 |

Figure 10B:
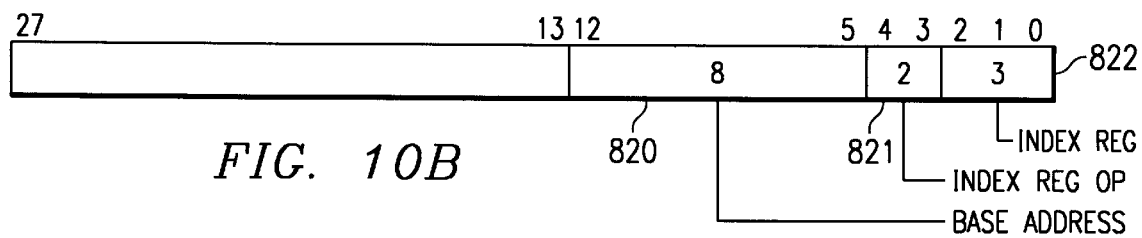
FIGS. 10B and 10C illustrate optional addressing fields for the instruction format of FIG. 10A.
Figure 10C:
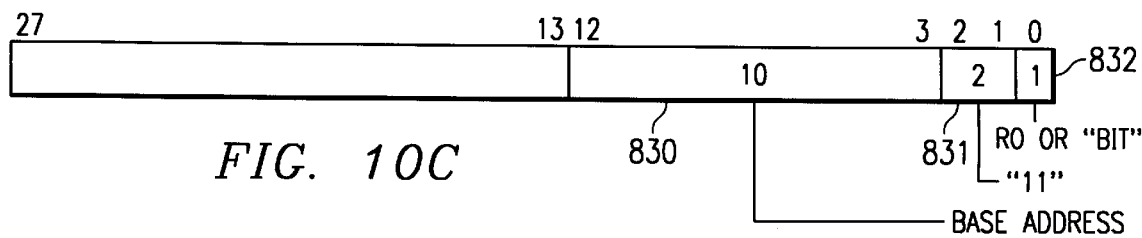

FIGS. 10B and 10C illustrate an optional addressing field which can be used in any of the previously discussed instructions. As discussed previously, addressing mode is specified by the MEM MODE field 804. There are four possible modes:

immediate: load a signed 13 bit value from the instruction word direct: load a memory location specified by a 13 bit field in the instruction word.

register: load a value from index register IR0–3 or BPU register R0 or R6.

indirect: load a value from memory, addressed via index register IR0–5 or BPU register R0 or R6

Index registers IR0–5 can optionally be modified concurrently with an indirect addressing operation. The possible modifications are post-increment or decrement by one, and post-load from the operational unit 200 result. The increment and decrement modifications allow stepping through arrays. The load modification is used to load an index register from the BPU register file.

When used in an addressing mode, BPU register R6 (alternate name "BIT") simulates bit addressing. If R6<15:0> is assumed to be a bit address, then bits R6<15:4> form the least significant 12 bits of the 14 bit word address, the most significant bits being set to zero. This value becomes the input to the address computation which is otherwise the same as for R0. Bits R6<3:0> are used by the get bit field instruction to complete the bit addressing function.

Register addressing mode has the same instruction format as indirect mode. The meaning of the fields is identical, however the result value is the computed memory address itself rather than the contents of memory at that address. This can be used to load the value of an index register into the BPU register file, or to compute the actual address referred to by an addressing operation.

Referring to FIG. 10B, base address field 820 specifies a base value that is combined with a selected index register to form a complete address. Index register operation field 821 specifies what operation is performed on a selected index register, as shown in Table 7. Index register source/destination field 822 specifies the selected index register, as shown in Table 8.

TABLE 7

Index Register Operation Field Codes

| Code | MNEMONIC | DESCRIPTION |
|---|---|---|
| 00 | none | no modification |
| 01 | ++ | post-increment by one |
| 10 | −− | post-decrement by one |
| 11 | = | post-load with ALU result |

TABLE 8

Index Register Source/Destination Field Codes

| CODE | MNEMONIC | DESCRIPTION |
|---|---|---|
| 000 | IR0 | index register 0 |
| 001 | IR1 | index register 1 |
| 010 | 1R2 | index register 2 |
| 011 | 1R3 | index register 3 |
| 100 | 1R4 | index register 4 |
| 101 | 1R5 | index register 5 |
| 110 | R0 | BPU register 0 |
| 111 | BIT | BPU register 6 (drop 4 LSBs) |

FIG. 10C illustrates a special case of the addressing mode illustrated in FIG. 10B in which the two most significant bits of IR src/dest field 822 are "11." In this case, no index register operation is done because a non-index register is selected, so index register operation field 821 is deleted. Thus, in FIG. 10C, base address field 830 is nine bits, as compared to seven bits for base address field 820 of FIG. 10B. Source/destination field 832 specifies one of two registers, as shown in Table 9.

TABLE 9

Source/Destination Field 832 Codes

| CODE | MNEMONIC | DESCRIPTION |
|---|---|---|
| 0 | R0 | BPU register 0 |
| 1 | BIT | BPU register 6 (drop 4 LSBs) |

Figure 11:
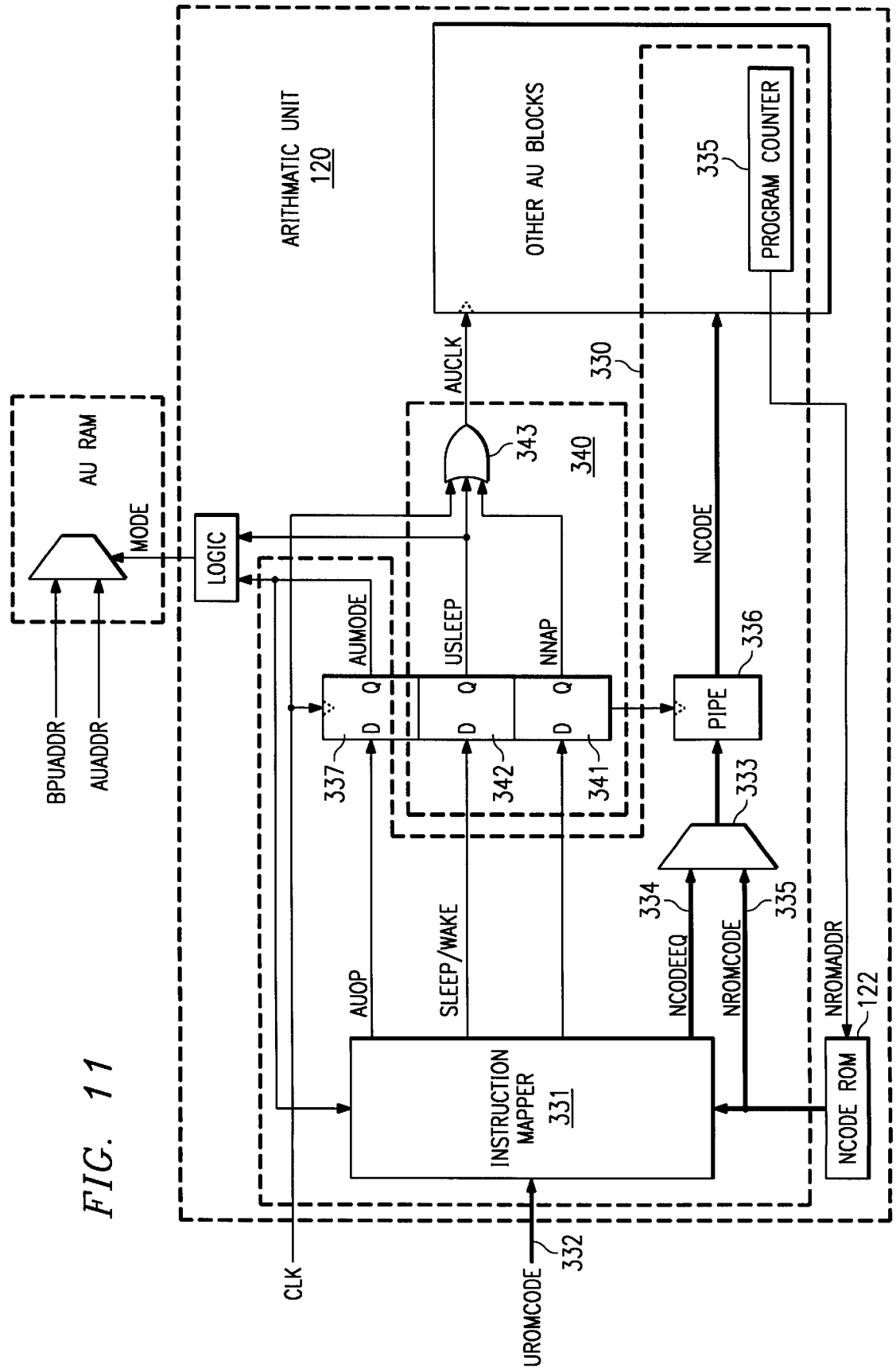
FIG. 11 is a block diagram illustrating an interface between the two processing units of FIG. 2 that supports the processing time-lines of FIGS. 8 and 9.

FIG. 11 is a block diagram illustrating an interface between the two processing units of FIG. 2 that supports the processing time-lines of FIGS. 8 and 9. One set of dotted lines enclose components of Micro Sequencer 330. Instruction Mapper 331 receives instruction directives from BPU 110 on bus 332 and examines them for relevance to AU 120. A selected instruction directive which corresponds to an auEx opcode is converted into an nCode equivalent and provided to mux 333 on bus 334 for a tightly coupled instruction execution. Mux 333 selects bus 334 during an auEx operation, and selects nROMcode input 335 during loosely coupled processing. Pipeline register 336 stages each instruction to the other AU blocks in AU 120.

Instruction Mapper 331 also detects when an auOp instruction directive is received and sets flipflop 337 to distinguish loosely coupled mode and tightly coupled mode. Instruction Mapper 331 also detects a Sleep/Wake directive from BPU 110 in response to a Sleep micro-instruction (Table 1) and a Nap or NAP_int nano-instruction executed by AU 120. Power control circuitry 340 records a nap or sleep condition in flip-flops 341 and 342. Gate 343 inhibits clocking to the other AU Blocks by signal AUClk, including Program Counter 335, when a nap or sleep condition is present. According to an aspect of the present invention, when instruction mapper 331 detects an auEx instruction directive, flipflop 341 is reset to put AU 120 in full power mode to allow the auEx instruction to be executed, and then instruction mapper 331 sets flipflop 341 to return AU 120 to a low power nap condition. Also, when instruction mapper 331 detects an auOp instruction directive, flipflop 341 is reset to allow the auOp instruction sequence to be executed in loosely coupled mode. As discussed earlier, the last instruction of an auOp sequence is typically a Nap or a NAP_int instruction. Thus, AU 120 can be advantageously placed in a low power mode by either a BPU Sleep instruction or an AU Nap instruction and awakened to execute a sequence of instructions in loosely coupled mode or a single instruction in tightly coupled mode.

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual devices which may be sold as bare die or packaged. After packaging, finished parts are biased into an operational state and tested for operational functionality.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

An advantage of the present invention is that BPU 110 can process sequences of instructions in parallel with AU 120. Both processors are loosely coupled and pass data by reading and writing to AU RAM 121. Advantageously, for a single instruction BPU 110 and AU 120 can be tightly coupled and pass data directly from an arithmetic unit in AU 120 to a storage circuit in BPU 110.

Another advantage of the present invention is that AU 120 can be placed in a low power mode and awakened to full power mode for the duration of a nano-instruction sequence in loosely coupled mode or for the duration of a single instruction in tightly coupled mode.

As used herein, the terms "micro-instruction" and "nano-instruction" are not meant to imply a particular type or class of instruction, but are used only to distinguish instruction executed by BPU 110 from instructions executed by AU 120. Aspects of the present invention are applicable to any device that processes instructions, including micro-code instructions, wide word instructions, reduced instruction set computers (RISC), etc.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

APPENDIX A: NANO INSTRUCTIONS FOR AU 120

A nano-instruction consist of 3 parts, with the exception of a branch:

1. Add Core,
2. Multiplier Core,
3. Memory I/O

In the case of a branch instruction (BrCC), Add and Mult Core defaults to a Nop and the bit fields are used to specify a condition code and an immediate address. However, a memory I/O still needs to be specified. A multiplier opcode should not be present in a branch instruction.

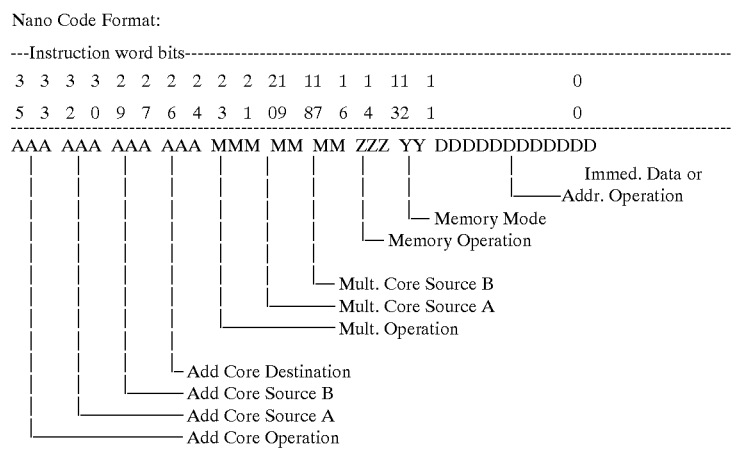

Nano Code Format:

```
---Instruction word bits-----------------------------------------------------------------
3  3  3  3  2  2  2  2  2  2  21  11  1  1  11  1                      0
5  3  2  0  9  7  6  4  3  1  09  87  6  4  32  1                      0
-----------------------------------------------------------------------------------------
AAA AAA AAA AAA MMMM MM MM ZZZ YY DDDDDDDDDDDD
 |   |   |   |    |    |  |   |   |        |_____Immed. Data or
 |   |   |   |    |    |  |   |   |_____Addr. Operation
 |   |   |   |    |    |  |   |_____Memory Mode
 |   |   |   |    |    |  |_____Memory Operation
 |   |   |   |    |    |_____Mult. Core Source B
 |   |   |   |    |_____Mult. Core Source A
 |   |   |   |_____Mult. Operation
 |   |   |_____Add Core Destination
 |   |_____Add Core Source B
 |_____Add Core Source A
 _____Add Core Operation
-----------------------------------------------------------------------------------------
       Note: For BrCC instruction, field(32–21) is redefined as target address,
       and field(20–17) is the condition code with bit 20 indicating direct or register
       (R0) branch. Add the dummy address label, ind_r0, to all register branch
       instruction.
```

| Add Core Operations (bits 35-33) | |
|---|---|
| Add | SrcA + SrcB −> Dest |
| Addc | SrcA + SrcB + Ci −> Dest |
| Sub | SrcA − SrcB −> Dest |
| Subc | SrcA − SrcB − Ci −> Dest |
| cSub | SrcA − SrcB −> Dest if (prev. Co = '0') |
| BrCC | Conditional/Unconditional Branch |
| Nap | Power-down |
| Nap_int | Power-down with interrupt |
| Add Core Source A (bits 32-30) | |
| 000 | R0 |
| 001 | R1 |
| 010 | R2 |
| 011 | R3 |
| 100 | R4 |
| 101 | R5, 0 (value = 0) |
| 110 | PPR, Mult Core Partial Product (Sum/Carry/Round) |
| 111 | LSR, LS 4 bits of Mult Core (For MPEG extended precision) |
| Add Core Source B (bits 29-27) | |
| 000 | R0 |
| 001 | R1 |
| 010 | R2 |
| 011 | R3 |
| 100 | R4 |
| 101 | R5, 0 (value = 0) |
| Add Core Destination B (bits 26-24) | |
| 000 | R0 |
| 001 | R1 |
| 010 | R2 |
| 011 | R3 |
| 100 | R4 |
| 101 | R5 (don't care, status unchanged) |
| Multiplier Core Operation (bits 23-21) | |
| 000 | Nop/Hold Partial Sum/Carry/Round values. |
| 001 | Multiply Cycle 1. |
| 010 | Multiply Cycle 1 with rounding. |
| 011 | Multiply Cycle 2/Ext. Precision Mult Cycle 3. |
| 100 | Extended Precision Multiply Cycle 1. |
| 110 | Extended Precision Multiply Cycle 2. |
| Multiplier Core Source A/B (bits 20-19/18-17) | |
| 00 | R0 |
| 01 | R1 |
| 10 | R2 |
| 11 | R3 |
| Memory Operation (bits 16-14) | |
| 000 | Load R0 |
| 001 | Load R1 |
| 010 | Load R2 |
| 011 | Load R3 |
| 100 | Nop |
| 101 | Store R0 |
| 110 | Store R3 |
| 111 | Store R4 |
| Memory Mode (bits 13-12) | |
| 00 | Immediate value |
| 01 | Direct memory address |
| 10 | IR values |
| 11 | Indirect via IR |
| Immediate Data/Address Operation (bits 11-0) | |
| Field | (For Register Mode: AS = 10/11) |
| 11-9 | Index Register address: |
| | 000 IR0 |
| | 001 IR1 |
| | 010 IR2 |
| | 011 IR3 |
| | 100 IR4 |
| | 101 IR5 |
| | 110 Status Register. |

-continued

| | |
|---|---|
| 8-7 | 00 : add offset to IR |
| | 01 : sub offset from IR |
| | 10 : Bit-reverse IR (LSB is ignored for Bit-reverse) |
| | 11 : Others |
| 6-3 | For field (8-7) = 00/01: Offset value. |
| | For field (8-7) = 10   : Don't care. |
| | For field (8-7) = 11   : |
| | 00xx : Add IR0 |
| | 01XX: subtract IR0. |
| | 10XX: Load Adder Core output. |
| 2-0 | MS field not affected by address operations and status generation: |
| | 000 operation affects all 12 bits. |
| | 001 MS bit will not be affected. |
| | 010 MS 2 bits will not be affected. |
| | 011 MS 3 bits will not be affected. |
| | ... |
| | 111 MS 7 bits will not be affected. |
| For Memory Mode = 00/01, the above field is immediate data. | |

What is claimed is:

1. A data processing device, comprising:
a plurality of processing units with at least a first processing unit connected to a first instruction memory and a second processing unit connected to a second instruction memory, wherein the first processing unit is operable execute instructions retrieved from the first instruction memory and wherein the second processing unit is operable execute instructions retrieved from the second instruction memory;
a data bus connected to each of the plurality of processing units and to a memory circuit, the data bus operable to transfer data between each of the plurality of processing units and the memory circuit, such that the first of the plurality of processing units is operable to store a first data word in the memory circuit and the second of the plurality of processing units is operable to read the first data word from the memory circuit;
a first instruction sequencer in the first processing unit, the first instruction sequencer operable to fetch instructions from the first instruction memory in response to addresses provided by the first instruction sequencer;
a second instruction sequencer in the second processing unit, the second instruction sequencer operable to fetch instructions from the second instruction memory in response to addresses provided by the second instruction sequencer; and
instruction interconnect circuitry operable to transfer a first instruction directive from the first instruction sequencer to the second instruction sequencer, the second instruction sequencer in the second processing unit operable to begin processing a first sequence of instructions selected from the second instruction memory in response to the first instruction directive, whereby the first processing unit and the second processing unit selectively operate in a loosely coupled manner.

2. The data processing device of claim 1, further comprising signaling means for informing the first processing unit that the second processing unit has completed the first sequence of instructions.

3. The data processing device of claim 2, wherein:
the first processing unit further comprises a first storage circuit and a first arithmetic circuit, the first arithmetic circuit having an output connected to an input of the first storage circuit, the arithmetic circuit operable to provide a first data word to the first storage circuit;

the second processing unit further comprises a second storage circuit and a second arithmetic circuit, the second arithmetic circuit having an output connected to an input of the second storage circuit, the arithmetic circuit operable to provide a second data word to the second storage circuit; and the data processing device further comprises a first data interconnect circuit connected to receive the first data word and the second data word and operable to provide a selected one of the first data word or second data word to the first storage circuit.

4. The data processing device of claim 3, further comprising a second data interconnect circuit connected to the input of the first storage circuit and operable to selectively provide a third data word received at the input of the first storage circuit to the second storage circuit.

5. The data processing device of claim 4, wherein the first instruction sequencer in the first processing unit is operable to execute a first instruction from the first instruction memory by sending a second instruction directive to the second instruction sequencer and by controlling the first data interconnect circuit and the second data interconnect circuit such that the second arithmetic circuit operationally replaces the first arithmetic circuit, whereby the first processing unit and the second processing unit selectively operate in a tightly coupled manner.

6. The data processing device of claim 5, wherein the first instruction sequencer is further operable to control the first data interconnect circuit and the second data interconnect circuit such that the second storage circuit operationally replaces the first storage circuit.

7. The data processing device of claim 6, further comprising a power control circuit connected to the second instruction sequencer, the power control circuit being operational to restore the second processing unit to a full power mode in response to detecting the first instruction directive.

8. The data processing device of claim 7, wherein the power control circuit is further operational to cause the second processing unit to enter a low power mode in response to a predetermined instruction decoded by the second instruction sequencer.

9. The data processing device of claim 8, wherein the power control circuit is further operational to cause the second processing unit to enter the full power mode to execute the second instruction directive and to then return to the low power mode.

10. A data processing device, comprising:
a plurality of processing units with at least a first processing unit connected to a first instruction memory and a second processing unit connected to a second instruction memory, wherein the first processing unit is operable execute instructions retrieved from the first instruction memory and wherein the second processing unit is operable execute instructions retrieved from the second instruction memory;
a first instruction sequencer in the first processing unit, the first instruction sequencer operable to fetch instructions from the first instruction memory in response to addresses provided by the first instruction sequencer;
a second instruction sequencer in the second processing unit, the second instruction sequencer operable to fetch instructions from the second instruction memory in response to addresses provided by the second instruction sequencer;
instruction interconnect circuitry operable to transfer a first instruction directive from the first instruction sequencer to the second instruction sequencer;

wherein the first processing unit further comprises a first storage circuit and a first arithmetic circuit, the first arithmetic circuit having an output connected to an input of the first storage circuit, the arithmetic circuit operable to provide a first data word to the first storage circuit;

wherein the second processing unit further comprises a second storage circuit and a second arithmetic circuit, the second arithmetic circuit having an output connected to an input of the second storage circuit, the arithmetic circuit operable to provide a second data word to the second storage circuit; and the data processing device further comprises a first data interconnect circuit connected to receive the first data word and the second data word and operable to provide a selected one of the first data word or second data word to the first storage circuit.

11. The data processing device of claim 10, further comprising a second data interconnect circuit connected to the input of the first storage circuit and operable to selectively provide a third data word received at the input of the first storage circuit to the second storage circuit.

12. The data processing device of claim 11, wherein the first instruction sequencer in the first processing unit is operable to execute a first instruction from the first instruction memory by sending a second instruction directive to the second instruction sequencer and by controlling the first data interconnect circuit and the second data interconnect circuit such that the second arithmetic circuit operationally replaces the first arithmetic circuit.

13. The data processing device of claim 12, wherein the first instruction sequencer is further operable to control the first data interconnect circuit and the second data interconnect circuit such that the second storage circuit operationally replaces the first storage circuit.

14. The data processing device of claim 13, wherein the second arithmetic circuit comprises a multiplier circuit.

15. An audio reproduction system, comprising:
means for acquiring a stream of data which contains encoded audio data;
a data device for processing the stream of data connected to the means for acquiring, the data device operable to form at least one channel of PCM data on an at least one device output terminal;
a digital to analog converter connected to the output terminal operable to convert the channel of PCM data to an analog audio signal on a D/A output terminal;
a speaker subsystem connected to the D/A output terminal; and
wherein the data device further comprises:
a plurality of processing units with at least a first processing unit connected to a first instruction memory and a second processing unit connected to a second instruction memory, wherein the first processing unit is operable execute instructions retrieved from the first instruction memory and wherein the second processing unit is operable execute instructions retrieved from the second instruction memory;
a data bus connected to each of the plurality of processing units and to a memory circuit, the data bus operable to transfer data between each of the plurality of processing units and the memory circuit, such that the first of the plurality of processing units is operable to store a first data word in the memory circuit and the second of the plurality of processing units is operable to read the first data word from the memory circuit;

a first instruction sequencer in the first processing unit, the first instruction sequencer operable to fetch instructions from the first instruction memory in response to addresses provided by the first instruction sequencer;

a second instruction sequencer in the second processing unit, the second instruction sequencer operable to fetch instructions from the second instruction memory in response to addresses provided by the second instruction sequencer; and instruction interconnect circuitry operable to transfer a first instruction directive from the first instruction sequencer to the second instruction sequencer, the second instruction sequencer in the second processing unit operable to begin processing a first sequence of instructions selected from the second instruction memory in response to the first instruction directive.

16. The audio reproduction system of claim 15, wherein the means for acquiring comprises a satellite broadcast receiver.

17. The audio reproduction system of claim 15, wherein the means for acquiring comprises a digital disk player.

18. The audio reproduction system of claim 15, wherein the means for acquiring comprises a cable TV receiver.

* * * * *